United States Patent [19]

White, Jr. et al.

[11] Patent Number: 5,653,409
[45] Date of Patent: Aug. 5, 1997

[54] STANDOFF

[75] Inventors: Frederick E. White, Jr., Marietta; Marty J. Kronz, Cumming; Gary D. Hammon, Woodstock, all of Ga.

[73] Assignee: Panduit Corp., Tinley Park, Ill.

[21] Appl. No.: 506,504

[22] Filed: Jul. 25, 1995

[51] Int. Cl.⁶ .................................................. F16L 3/00
[52] U.S. Cl. ........................ 248/73; 248/74.3; 24/16 PB
[58] Field of Search .......................... 248/74.3, 74.1, 248/74.2, 73, 71, 56, 68.1, 69; 24/16 PB, 17 AP, 30.5 P, 453

[56] References Cited

U.S. PATENT DOCUMENTS

| | | | |
|---|---|---|---|
| 3,250,505 | 5/1966 | Rodman, Sr. et al. | 248/49 |
| 3,913,876 | 10/1975 | McSherry | 248/73 |
| 4,439,902 | 4/1984 | Huxtable | 24/278 |
| 4,655,023 | 4/1987 | Yung | 52/685 |
| 4,768,741 | 9/1988 | Logsdon | 248/62 |
| 4,862,560 | 9/1989 | Lichtenberg | 24/165 PB |
| 4,899,963 | 2/1990 | Murphy | 248/65 |
| 4,993,669 | 2/1991 | Dyer | 248/61 |
| 5,119,528 | 6/1992 | Ono et al. | 24/16 PB |
| 5,121,524 | 6/1992 | Mortensen | 24/16 PB |
| 5,169,100 | 12/1992 | Milcent et al. | 248/68.1 |
| 5,386,615 | 2/1995 | Bernard | 248/74.3 |

*Primary Examiner*—Leslie A. Braun
*Assistant Examiner*—Willie Berry, Jr.
*Attorney, Agent, or Firm*—Mark D. Hillard; Robert A. McCann

[57] ABSTRACT

A standoff for use with a cable tie for securing a wire bundle at a spaced distance from a mounting panel including a pair of opposing strap passageways extending from a top to a bottom side of the standoff and including access slots connecting the strap passageways to the exterior of the body.

15 Claims, 4 Drawing Sheets

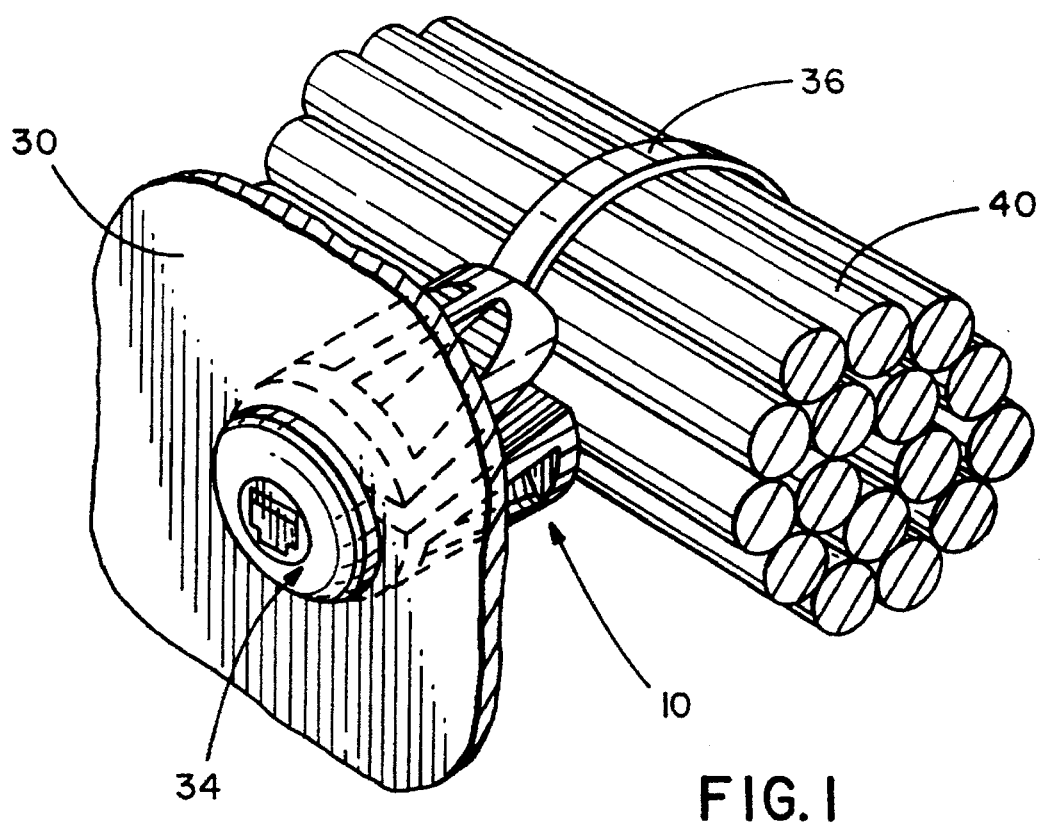
FIG. 1
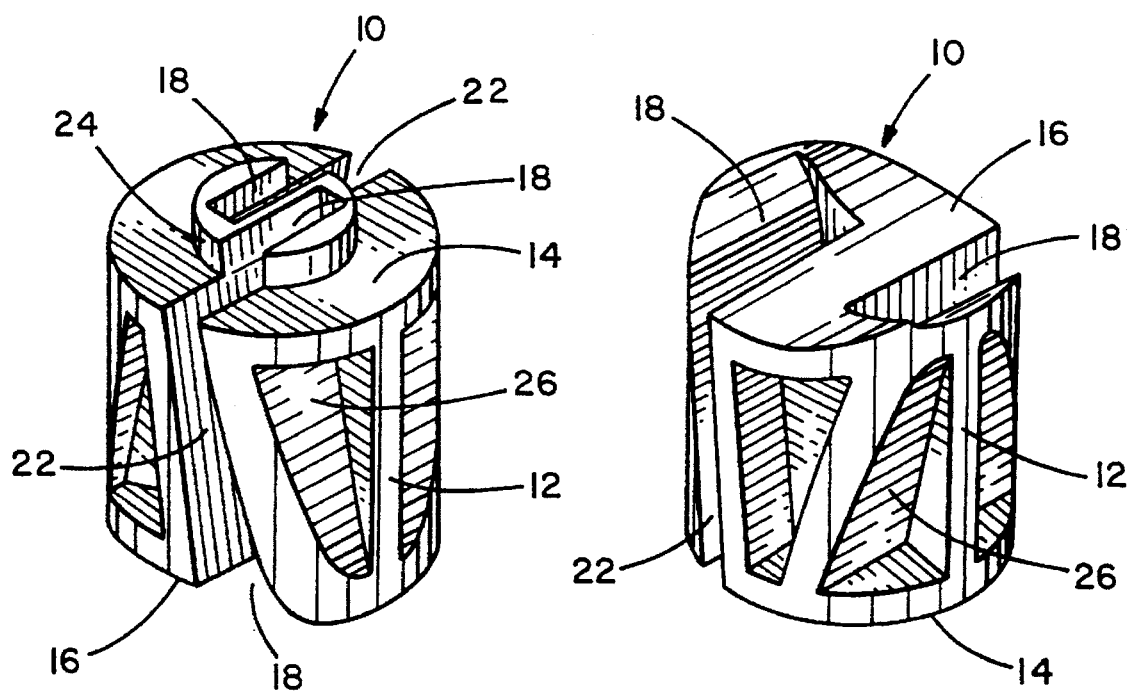
FIG. 2
FIG. 3

STANDOFF

TECHNICAL FIELD

The present invention relates to a standoff for maintaining at a spaced distance, a bundle of wires secured by a cable tie to a panel, and more particularly to a standoff having an interior strap passageway through the standoff extending from a top to a bottom side that is accessible from the exterior of the standoff between the top and bottom sides so that the standoff is easier to apply.

BACKGROUND OF THE INVENTION

In the electrical industry there are a wide variety of applications in which bundles of wires or cables are mounted to panels or other similar mounting surfaces. In many of these applications a buttonmount type of cable tie is utilized. Buttonmount ties have an enlarged head portion that allows the strap to be inserted from a first side of the panel through a hole to the second side, looped around the bundle, and reinserted to the first side where it is lockingly engaged. The bundle of wires is therefore secured against the second side while the enlarged head portion prevents the tie from passing through the hole. It is often preferable for these applications to have the bundle held in a position spaced from the panel so as to avoid marring of the wires by the sharp edges remaining when a hole is punched in the panel.

Prior standoffs have included a generally cylindrical member having a single bore. In use the cable tie strap is inserted through the hole of the mounting surface and through the bore of the standoff looped around the bundle and reinserted back through the bore and the hole to be engaged with the locking head. A problem encountered in the field when using this prior art standoff is that the cable tie must be inserted into the mounting hole and within the bore of the standoff at the same time as it is being secured around the bundle. Therefore, improvement in the art is needed.

In general, a standoff for use with a cable tie for securing a wire bundle to a panel at a spaced distance from the panel, includes a body having a top side, a bottom side, and outer side surfaces therebetween for defining an interior separated from an exterior of the body; a pair of opposing strap passageways extending through the interior of the body from the top side to the bottom side; and a pair of access slots disposed between the top and bottom sides connecting the strap passageways to the exterior of the body.

Also, a standoff for holding a wire bundle a spaced distance from a panel for use with a cable tie in which a cable tie strap is inserted through an aperture in a mounting surface, looped around a bundle, and inserted back through the aperture and secured thereto, generally includes a body member having a top end for abutting a side of the mounting surface, a bottom end for positioning the wire bundle a spaced distance from the mounting surface, and outer side surfaces therebetween for defining an interior separated from an exterior of the body; strap passageway means provided on the interior of the body for allowing the cable tie strap to be passed through the body from the top to the bottom end; and access means disposed on at least one side surface of the body and situated between the top end or the bottom end of the body for providing access to the strap passageway means.

SUMMARY OF THE INVENTION

It is therefore an object of the present invention to provide an improved standoff for use with a cable tie for holding a wire bundle a spaced distance from a panel.

It is a further object of the present invention to provide an improved standoff that is easier to apply to a cable tie for securing a bundle to a panel.

It is still further an object of the present invention to provide an improved standoff for use with a cable tie after securing a bundle to a panel.

BRIEF DESCRIPTION OF THE DRAWINGS

FIG. 1 is a perspective view of a standoff of the present invention shown securing a bundle of wires at a spaced distance to a panel.

FIG. 2 is a perspective top view of the standoff of FIG. 1.

FIG. 3 is a perspective bottom view of the standoff of FIG. 1.

DESCRIPTION OF THE PREFERRED EMBODIMENT

Figures 4, 5:
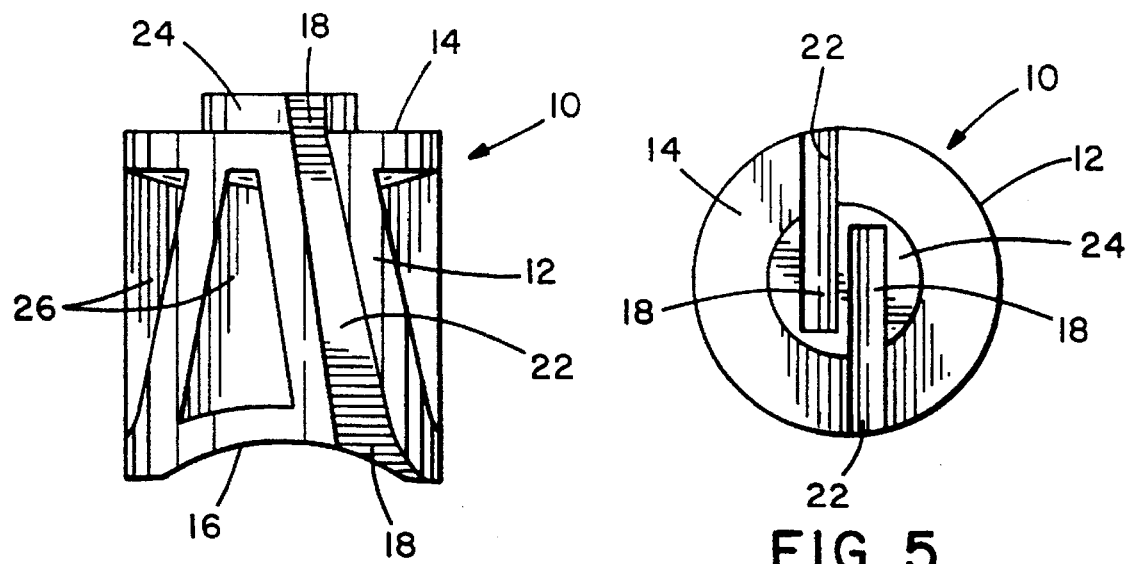
FIG. 4 is a side view of the standoff of FIG. 1.
FIG. 5 is a plan view of the standoff of FIG. 1.
Figure 6:
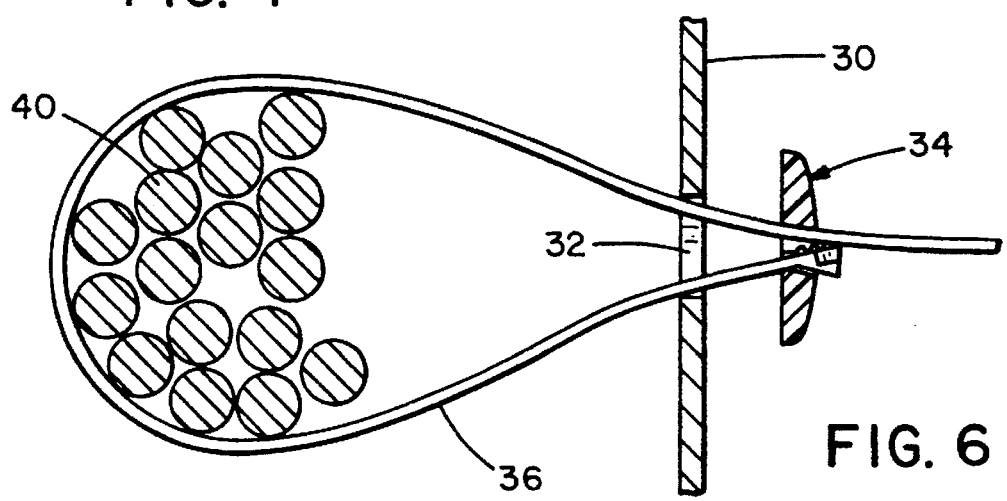
FIG. 6 shows a wire bundle being initially secured to a mounting panel by a button head type cable tie.

A standoff embodying the concept of the present invention is designated generally by the reference numeral 10 in the accompanying drawings and is formed of plastic.

As can be seen in FIGS. 2 and 3, standoff 10 includes a generally cylindrical body 12 having a top side 14 and a bottom side 16 and including a pair of strap passageways 18 extending from the top 14 to the bottom 16 through the interior of body 12. Top side 14 includes a centering shoulder portion 24 that is also generally cylindrically shaped which provides a seat for the standoff and helps to center standoff 10 within a hole 40 of the mounting panel 30 as the top side 14 abuts the underside of mounting panel 30. As can be seen in FIG. 3, bottom side 16 of standoff 10 includes a radiused surface so as to have a concave shape for centering the wire bundle 40 to the underside of standoff 10.

As can be seen in FIGS. 3–5, strap passageways 18 are opposing and spaced relatively near each other at the top 14 of standoff 10 and extend through the interior of standoff 10 in a divergent angled manner so they are spaced apart a greater distance at the bottom 16 of standoff 10. Standoff 10 also includes access slots 22 extending the length of strap passageways 18 so as to provide access from the exterior of the body 12 to the interior strap passageways 18. The exit surfaces of access slots 22 and strap passageways 18 are rounded off at the bottom side 16. This rounding off of the exit surfaces at the bottom 16 in conjunction with the divergingly angled strap passageways 18 results in a smaller bend radius for the bundling strap 36.

In operation, as can best be seen in FIGS. 6–9 and 11, the user utilizes a cable tie such as a buttonmount tie which includes an enlarged head portion of sufficient size greater than the hole 32 and includes a strap with a locking head.

Figure 7:
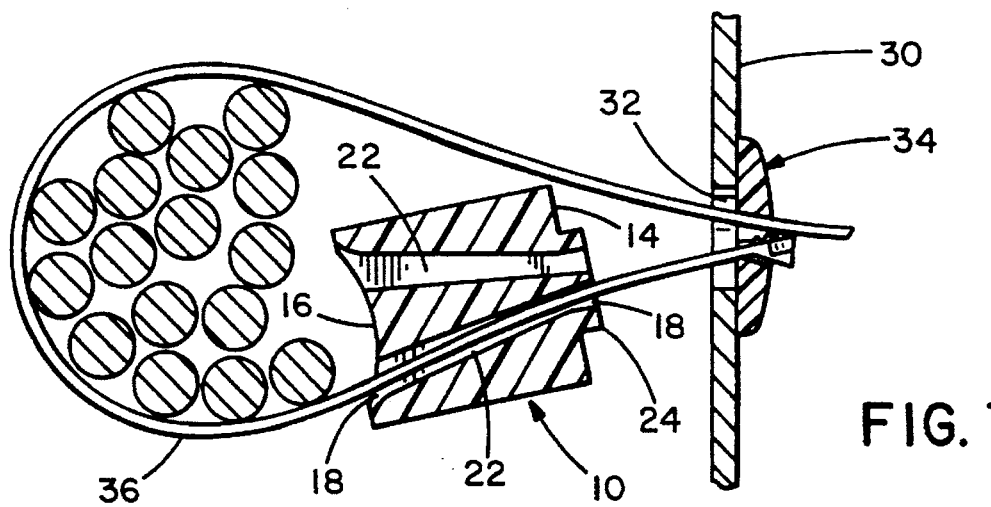
FIG. 7 is a cross sectional view of the standoff of FIG. 1 being applied to the cable tie of FIG. 6.
Figure 8:
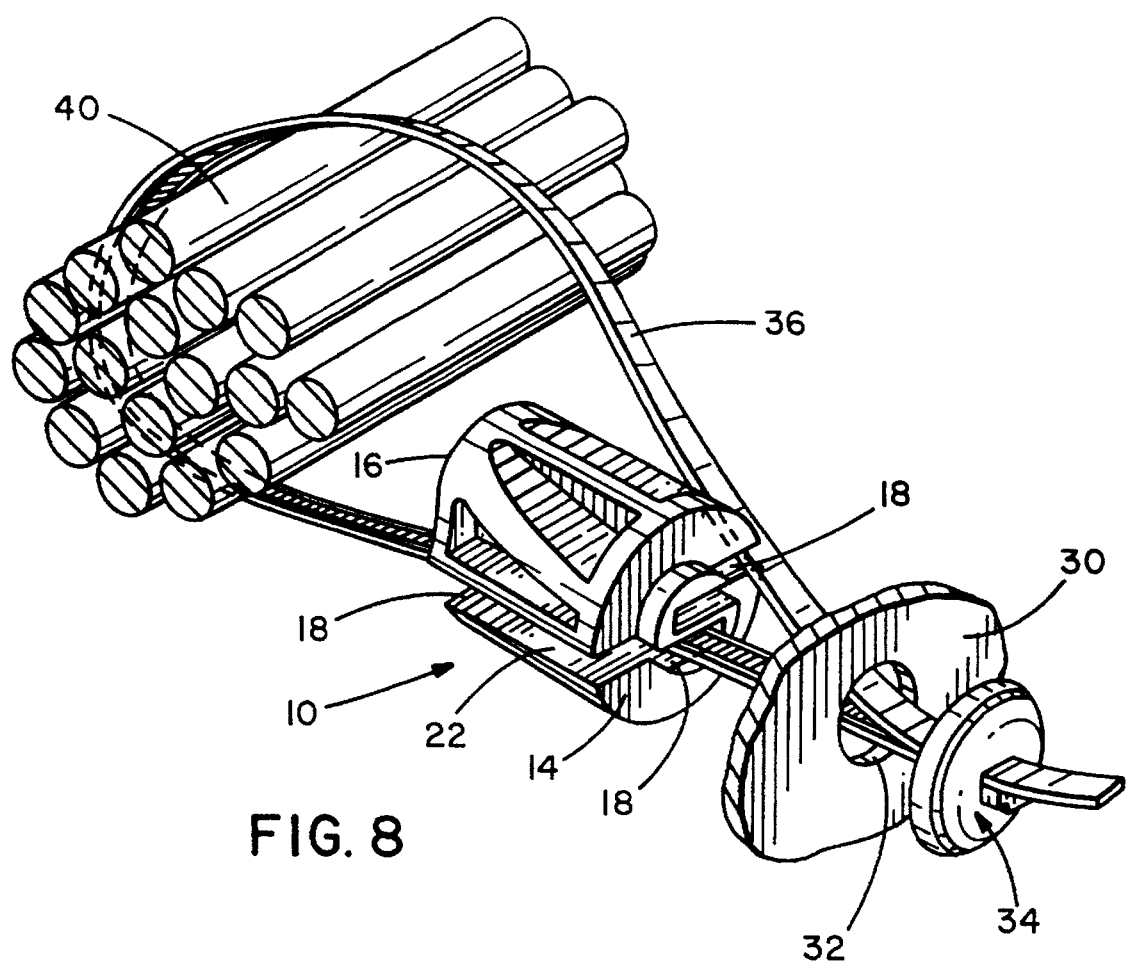
FIG. 8 is a perspective view of the standoff being applied to the cable tie of FIG. 6.
Figure 9:
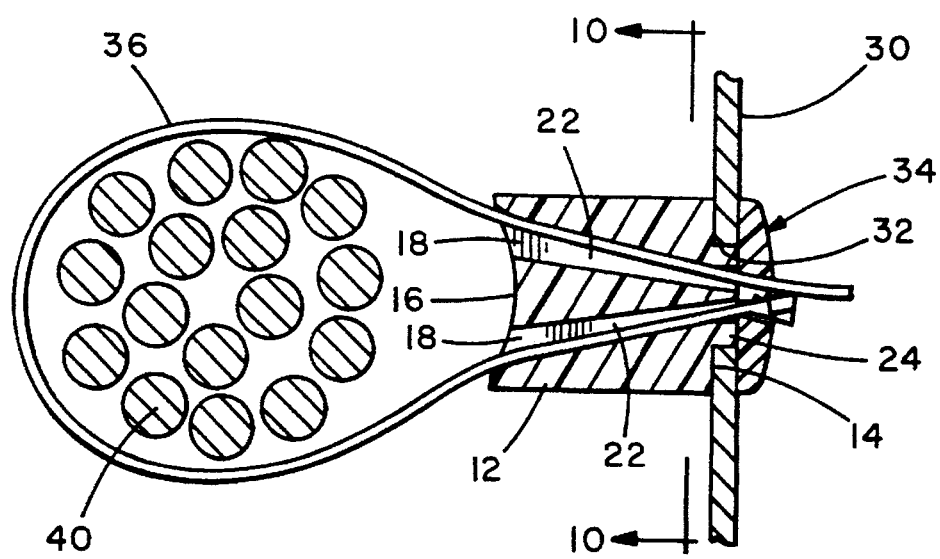
FIG. 9 is a cross sectional view of the standoff fully applied to the cable tie.
Figure 10:
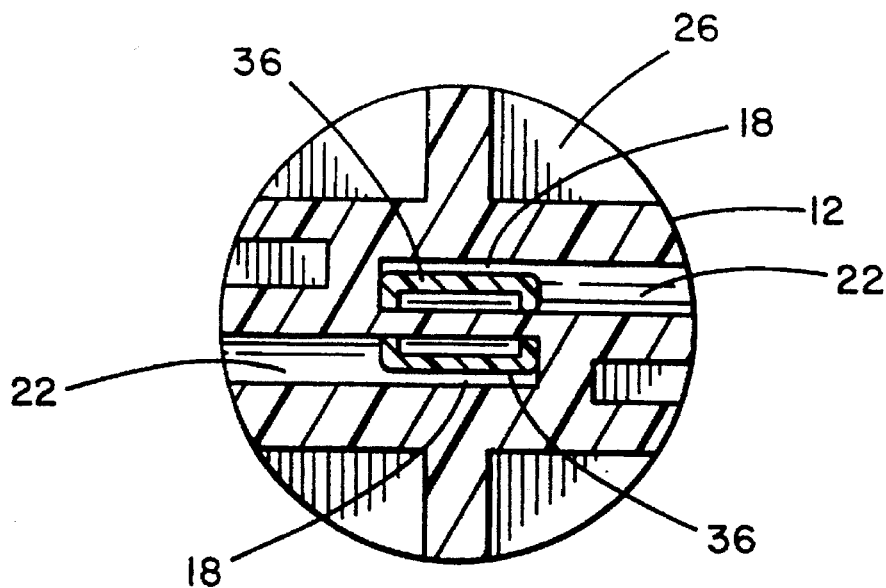
FIG. 10 is a cross sectional view of the standoff engaged with a cable tie shown along lines 10—10.
Figure 11:
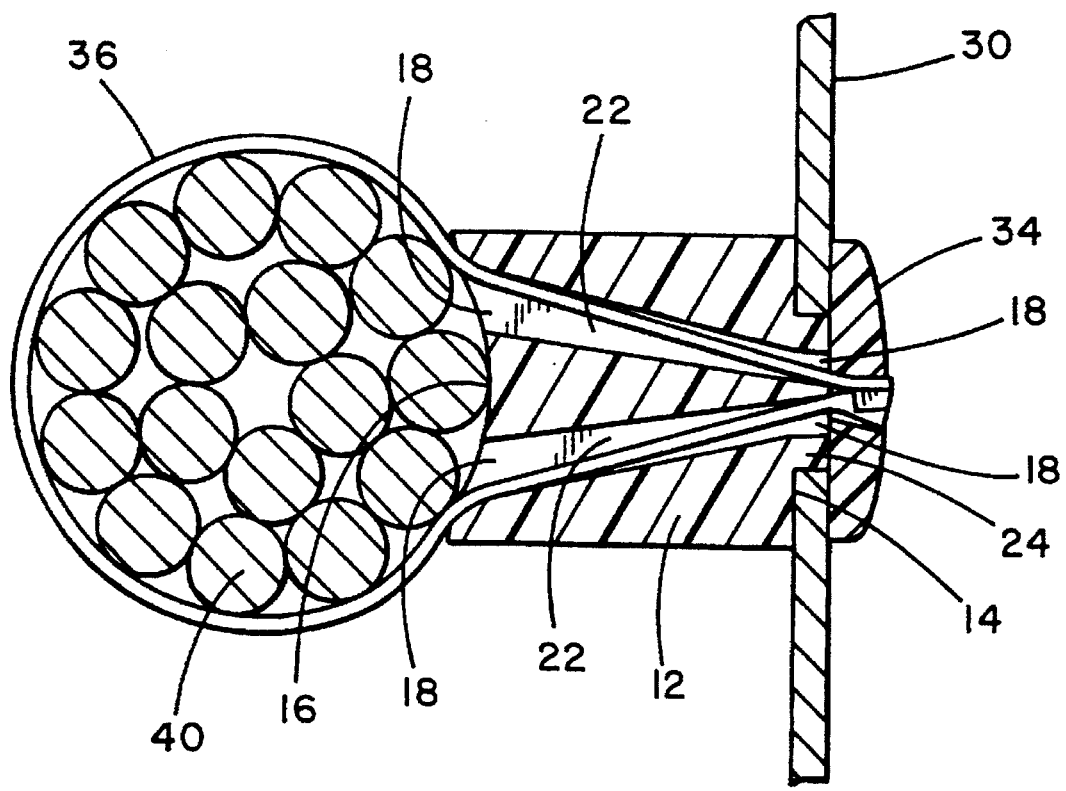
FIG. 11 is a cross sectional view of a wire bundle being held a spaced distance from a mounting panel by the standoff of FIG. 1.

The user inserts the leading end of strap 36 through hole 32, around bundle 40, and reinserts the leading end of strap 36 back through hole 32 to partially engage with the locking head of cable tie 34. As shown in FIG. 7, when cable tie 36 is temporarily securing bundle 40 to mounting panel 30, standoff 10 can be applied by inserting a portion of strap 36 on each side of bundle 40 into access slots 22 to reach the strap passageways 18. Access slots 22 are provided on opposing side surfaces of body 12 to allow for easier insertion of both the strap portions surrounding the bundle into strap passageways 18. After straps 36 on both sides of bundle 40 have been inserted into strap passageways 18 of standoff 10, cable tie 34 can be tightened completely as shown in FIG. 11.

It is to be noted that while standoff 10 has been shown and described as having a generally cylindrical body, that other configurations could also be employed. Similarly, it is also noted that standoff 10 as shown includes a plurality of cutout sections 26. Cutout sections 26 are used to eliminate material and reduce cost of the standoff while maintaining the required strength. The number, size and shape of these cutout sections are not essential and can be varied for different standoff configurations.

While the particular preferred embodiment of the present invention has been shown and described, it will be obvious to those skilled in the art the changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A standoff for use with a cable tie for securing a wire bundle to a panel having a hole at a spaced distance from the panel, comprising:

a standoff body having a top side for abutting the panel, a bottom side, and outer side surfaces therebetween for defining an interior separated from an exterior of the standoff body;

a pair of opposing strap passageways extending through the interior of the standoff body from the top side to the bottom side; and a pair of access slots disposed between the top and bottom sides connecting the strap passageways to the outer side surface of the exterior of the standoff body.

2. A standoff according to claim 1, wherein the strap passageways are opposing and disposed so as to be relatively near each other at the top of the body and divergingly angled so as to be spaced further apart at the bottom.

3. A standoff according to claim 2, wherein the strap passageways further include an exit surface having a rounded shape at the bottom side.

4. A standoff according to claim 1, wherein access slots are formed on opposite side surfaces.

5. A standoff according to claim 1, wherein the top side includes a shoulder portion for centering the standoff body in the hole of the panel.

6. A standoff according to claim 5, wherein the shoulder portion is cylindrical.

7. A standoff according to claim 1, wherein the bottom side is radiused so as to be concave.

8. A standoff for holding a wire bundle a spaced distance from a panel for use with a cable tie in which a cable tie strap is inserted through an aperture in a mounting surface, looped around a bundle, and inserted back through the aperture and secured thereto, comprising:

a body member having a top end for abutting a side of the mounting surface, a bottom end for positioning the wire bundle a spaced distance from the mounting surface, and outer side surfaces therebetween for defining an interior separated from an exterior of the body;

strap passageway means provided on the interior of the body for allowing the cable tie strap to be passed through the body from the top to the bottom end; and access means disposed on at least one of the outer side surfaces of the body and situated between the top end and the bottom end of the body for providing access from the exterior side of the body to the strap passageway means.

9. A standoff according to claim 8, wherein the strap passageway means is a pair of opposing strap passageways extending through the body from the top side to the bottom side.

10. A standoff according to claim 9, wherein the strap passageways are disposed so as to be relatively near each other at the top of the body and divergingly angled so as to be spaced further apart at the bottom.

11. A standoff according to claim 9, wherein the access means is a pair of access slots disposed between the top and bottom ends connecting the strap passageways to the exterior of the body.

12. A standoff according to claim 11, wherein the pair of access slots are formed on opposite side surfaces.

13. A standoff according to claim 8, wherein the top includes a shoulder portion for centering the body in a hole of the panel.

14. A standoff according to claim 13, wherein the shoulder portion is cylindrical.

15. A standoff according to claim 8, wherein the bottom side is radiused to as to be concave.

* * * * *